(12) United States Patent
Terazoe

(10) Patent No.: US 6,320,352 B2
(45) Date of Patent: Nov. 20, 2001

(54) ELECTRIC COUPLING APPARATUS FOR CHARGING DEVICE

(75) Inventor: Masahiko Terazoe, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/731,357

(22) Filed: Dec. 6, 2000

(30) Foreign Application Priority Data

Dec. 6, 1999 (JP) .................................................. 11-346701

(51) Int. Cl.$^7$ .................................................. H01M 10/46
(52) U.S. Cl. ............................................................. 320/108
(58) Field of Search .................................. 320/107, 108, 320/109; 336/DIG. 2

(56) References Cited

U.S. PATENT DOCUMENTS

| | | | |
|---|---|---|---|
| 5,408,209 | * | 4/1995 | Tanzer et al. .................... 320/108 X |
| 5,483,143 | * | 1/1996 | Hall et al. ............................. 320/108 |
| 5,594,315 | * | 1/1997 | Ramos et al. ........................ 320/108 |
| 5,703,462 | * | 12/1997 | Woody et al. ........................ 320/108 |
| 6,084,381 | * | 7/2000 | Kajiura ................................. 320/108 |

* cited by examiner

Primary Examiner—Edward H. Tso
(74) Attorney, Agent, or Firm—Morgan & Finnegan, LLP

(57) ABSTRACT

An electric coupling apparatus for charging a battery. A power supply coupler is adapted to be inserted to a power receiver coupler. The power supply coupler has a primary core and a primary coil located around the primary core. The power receiver coupler has a secondary core and a secondary coil located in the secondary core. The secondary core includes first and second core members. The first core member has a magnetic pole protruding through the secondary coil and yokes extending from the magnetic pole. The second core member has a recess that faces the power supply coupler to conduct air for cooling the power supply coupler.

9 Claims, 7 Drawing Sheets

Fig.7 (Prior Art)
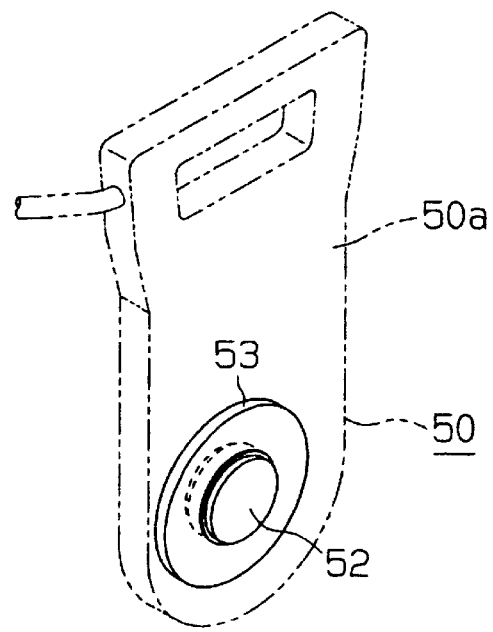
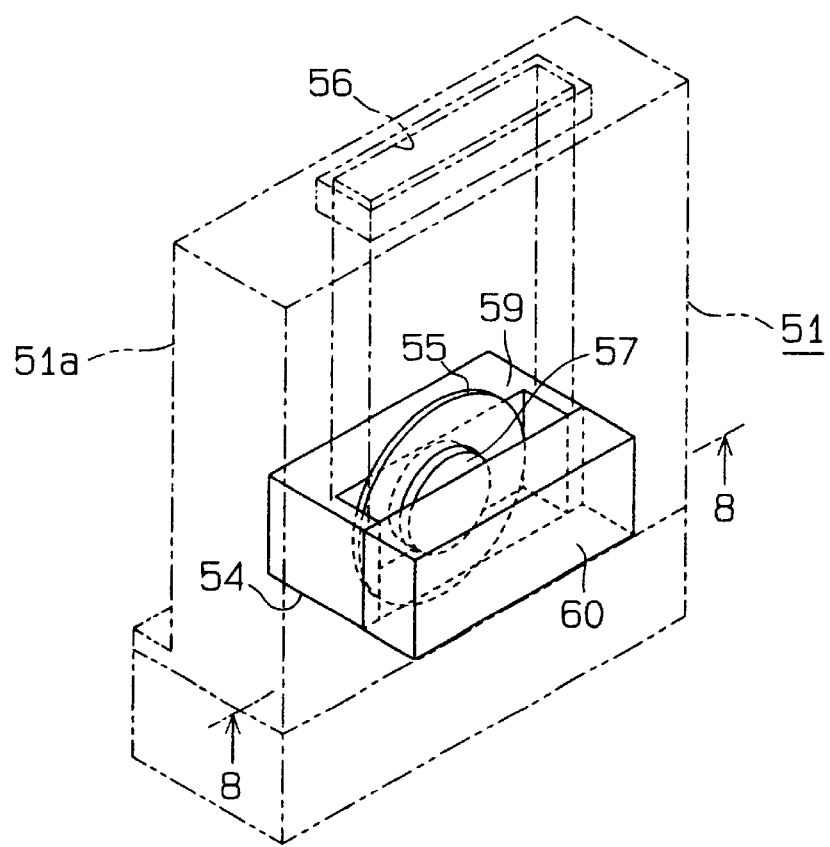

ELECTRIC COUPLING APPARATUS FOR CHARGING DEVICE

BACKGROUND OF THE INVENTION

This invention relates to electric charging devices for batteries and, more particularly, to an electric coupling apparatus suited for electromagnetic type induction charging devices for use in self-propelled objects such as electric vehicles powered by batteries.

Non-contact type battery charging devices have heretofore been proposed to charge batteries of electric vehicles by means of electromagnetic, inductive charging.

Each of the battery charging devices includes a power supply charging device, which is located at a charging station and has a power supply coupler, and a power receiver charging device, which includes a power receiver coupler that is mounted, for example, in the vehicle. The power supply charging device and the power receiver charging device are electrically coupled to each other by coupling a power supply coupler 50 to a power receiver coupler 51 as shown in FIG. 7.

The power supply coupler 50 includes a paddle-shaped casing 50a. The casing 50a houses a primary core 52 and a primary coil 53. The power receiver coupler 51 includes a box-shaped casing 51a having an opening 56 into which the power supply coupler 50 is inserted. The casing 51a houses a secondary core 54 and a secondary coil 55.

When the power supply coupler 50 is inserted into the power receiver coupler 51, a closed magnetic flux circuit is formed between the cores 52 and 54. When an alternating electric current is supplied to the coil 53 from the power supply charging device, an electromotive force is induced in the secondary coil 55 of the power receiver charging device due to electromagnetic induction. This electric power is converted to direct electric power and is used to charge the battery of the vehicle.

In the above-mentioned prior art power receiver coupler, an extremely small gap is formed between a core member 60 and the power supply coupler 50, thereby providing a high charging rate. FIG. 8 shows a typical arrangement of cores of the power supply coupler and the power receiver coupler.

The primary core 52 of the power supply coupler 50 is located in the lower end of the casing 50a. Both ends of the primary core 52 are exposed. The coil 53 is assembled in the casing 50a, while wound around the primary core 52. The secondary core 54 of the power receiver coupler 51 includes a core member 59 and a core member 60. The core member 59 has a magnetic pole 57 and a pair of yokes 58, which extend upright at the ends of the magnetic pole 57. The core member 60 has a plate like configuration and is combined with the core member 59 to magnetically connect the yokes 58 to one another. A hollow is formed between the core members 59 and 60. The casing 50a of the power supply coupler 50 fits in the hollow. A secondary coil 55 is formed in a printed circuit board and has a bore formed in its center. The magnetic pole 57 fits in the bore and extends into the hollow between the cores 59 and 60.

In the prior art electric coupling devices discussed above, there is a great deal of heat generated by the coils 53 and 55 and the temperature of the cores 52 and 54 increases. The core 54 and the coil 55 in the power receiver coupler 51 are cooled by air that flows through the casing 51a. The core 52 and the coil 53 of the power supply coupler is cooled by the air surrounding the casing 50a.

In the structure mentioned above, the gap between the casing 50a and the core member 60 is extremely small and cooling air scarcely circulates through the gap. For this reason, the casing of the power receiver coupler 51 tends to overheat. The temperature of the coil 53, the core 52 and the core member 60 of the power receiver coupler 51 increase to an extremely high level.

When the temperature increases, the printed circuit board and other electric components may be damaged or malfunction.

SUMMARY OF THE INVENTION

It is therefore an object of the present invention to provide an electric coupling apparatus for a battery charging device to enable charging of batteries in a reliable manner at all times.

In order to meet the above and other objects, the present invention provides an electric coupling apparatus for a charging device.

The electric coupling apparatus has a power supply coupler and a power receiver coupler that is coupled to the power receiver coupler. The power supply coupler includes a first coil and a first core around which the first coil is located. The power receiver coupler includes a second core, which forms a magnetic flux path with the first core. The second coil located around the second core to generate an inductive electromotive force with the magnetic path in response to electric power applied to the first coil. The first coil of the power receiver coupler is formed with a recess in a region adjacent to the first coil.

The present invention also provides a coupling apparatus for a charging device.

The electric coupling apparatus has a power supply coupler and a power receiver coupler that is coupled to the power receiver coupler. The power supply coupler includes a hollow casing having a paddle shape, the first core accommodated in the hollow casing, and the first coil located around the first core and in the hollow casing. The power receiver coupler includes a second core including a first core member, which has a magnetic pole, and yokes extending at opposite ends of the magnetic pole, and a second core member for forming a magnetic flux path with the first core member. The power receiver coupler further includes a second coil surrounding the magnetic pole to generate an inductive electromotive force in response to electric power applied to the first coil and a casing enclosing the second core and the second coil, the second core having a recess formed in a region facing the first coil to conduct air to cool the first coil. The casing of the power receiver coupler receives the casing of the power supply coupler to couple the power supply coupler with the power receiver coupler. The first coil of the power receiver coupler is adjacent to the recess when the power supply coupler is coupled to the power receiver coupler.

The present invention further provides a power receiver coupler for use in an electric coupling apparatus including a power supply coupler having a first core and a first coil surrounding the first core, which includes:

a casing having an opening to allow insertion of the power supply coupler;

a second core located in the casing, the second core including a first part, which has a magnetic pole and yokes, a second part, which is magnetically coupled to the first part, wherein a second coil is wound around the magnetic pole, the second core having a space between the first and second parts to accommodate the power supply coupler to cause the first core to form a closed magnetic flux path with the second core, which produces an inductive electromotive force in the second coil, the second core having a recess that faces the first coil to conduct an air stream to cool the first coil.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a view illustrating a power supply coupler and a power receiver coupler of a prior art electric coupling apparatus.

DETAILED DESCRIPTION OF THE PREFERRED EMBODIMENTS

FIGS. 1 to 6 show a preferred embodiment of an electric coupling apparatus of an electromagnetic induction type according to the present invention for charging electric vehicle batteries.

Figure 1:
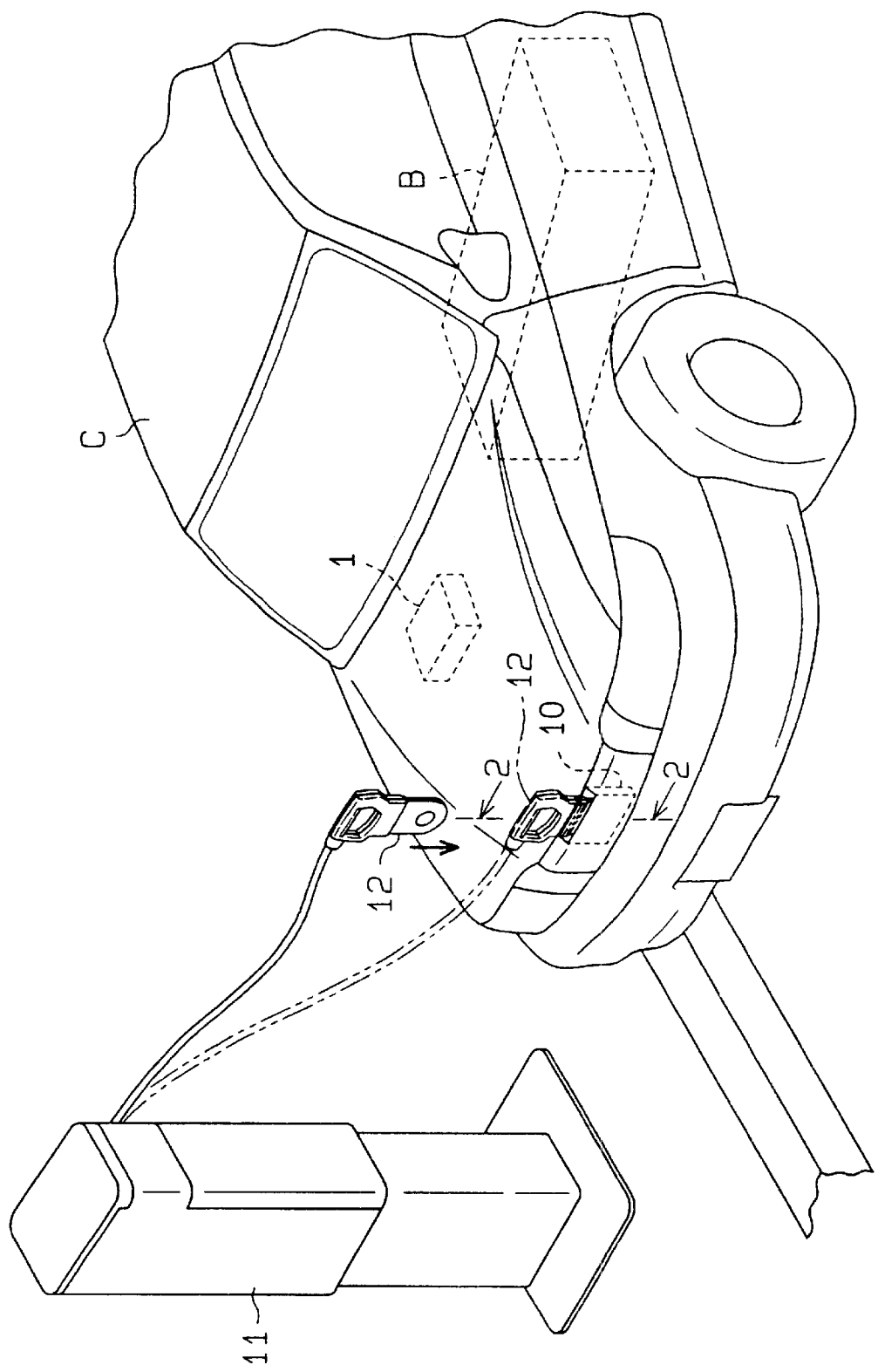
FIG. 1 is a schematic view of a preferred embodiment of an electric coupling apparatus according to the present invention as applied to an electric vehicle and a charging station.

As shown in FIG. 1, an electric vehicle C includes a power receiver charging device 1, a power receiver coupler 10, a battery B and an electric motor (not shown), which is powered by the battery B. The electric motor forms part of the drive mechanism of the electric vehicle C. The electric vehicle C is propelled by the electric motor by electric power delivered from the battery B.

The power receiver coupler 10 is located at a front part of the electric vehicle C and is electrically connected to the power receiver charging device 1 via a cable (not shown). A power supply charging device 11 is located in a power charging station. A power supply coupler 12 is electrically connected to the power supply charging device 11 via a cable. Charging of the battery B is performed by coupling the power supply coupler 12 to the power receiver coupler 10.

Figure 2:
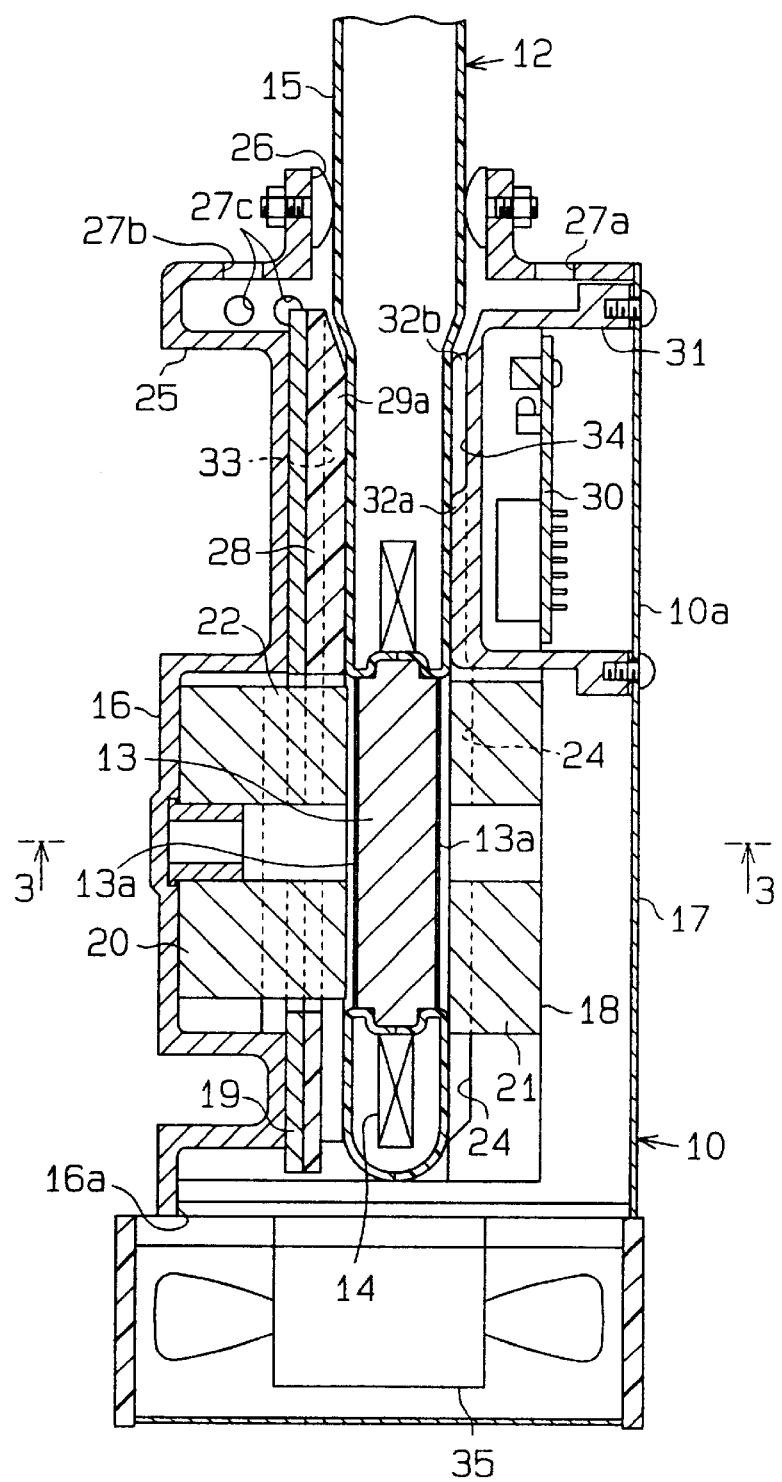
FIG. 2 is an enlarged cross sectional view of a power supply coupler and a power receiver coupler taken on line 2—2 of FIG. 1.

As seen in FIG. 2, the power supply coupler 12 has a hollow casing 15 which is configured in a paddle shape. In the lower ends of the lower end of the hollow casing 15 is a disk like primary core 13 having a relatively large thickness and an annular primary coil 14, which is wound around the primary core 13. The primary core 13 is located in a through bore formed at the lower end of the casing 15 and its end surfaces 13a are exposed. The primary coil 14 is located around the primary core 13, is accommodated in the casing 15, and is electrically connected to the power supply circuit of the power supply charging device 11.

The power receiver coupler 10 includes a casing 10a. The casing 10a includes a housing 16 and a cover 17, which is attached to the housing 16. The housing 16 is box shaped and has a bottom end and a rear end, which is open. The housing 16 has an upper wall 25 formed with a coupler opening 26 to allow insertion of the power supply coupler 12. The cover 17 is attached to the housing 16 to cover the rear opening of the housing 16 and is fixed by screws.

A core 18 and a secondary coil 19 are located in the casing 10a at a lower location as shown in FIG. 2.

Figure 3:
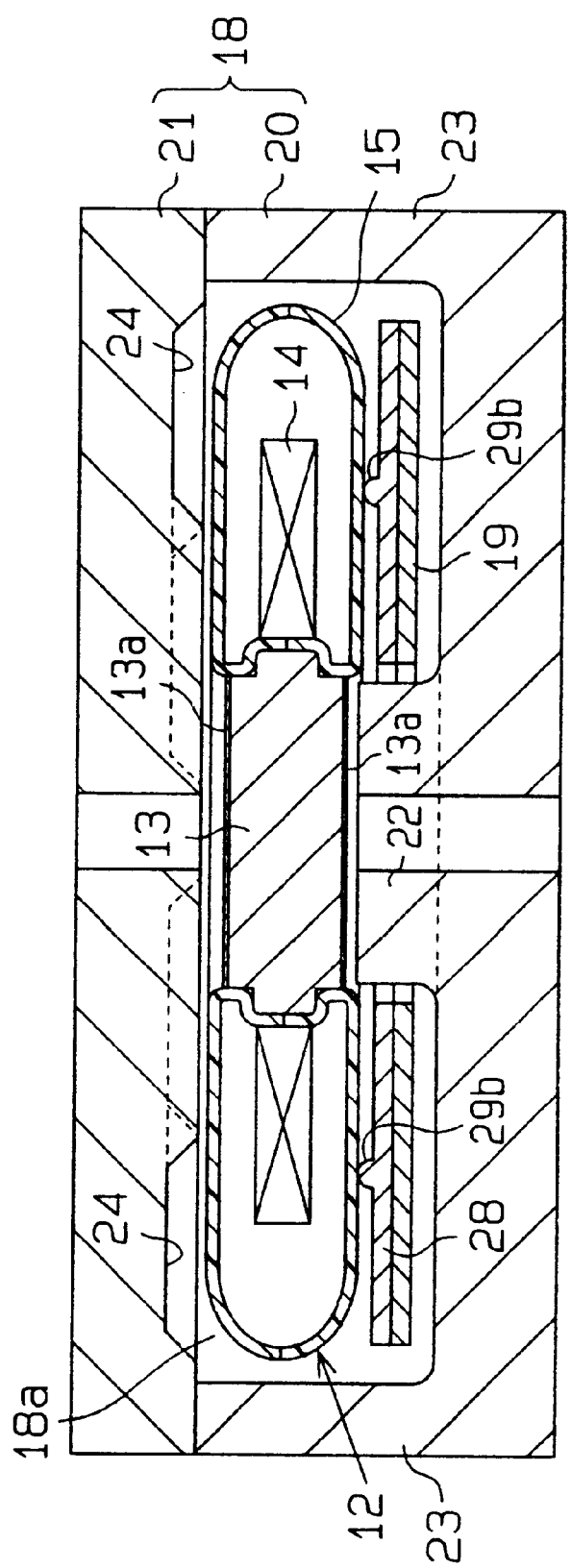
FIG. 3 is an enlarged cross sectional view of the power supply coupler and the power receiver coupler taken along line 3—3 of FIG. 2.

The secondary coil 19 may be formed on a printed circuit board formed by a plurality of multiplier boards. The winding may be printed on the circuit board. As best shown in FIG. 3, the core 18 includes a first core member 20 having an E-shaped cross sectional area and a second core member 21 having an I-shaped cross section. The first and second core members 20 and 21 are formed of a sintered ferrite material.

Figure 5:
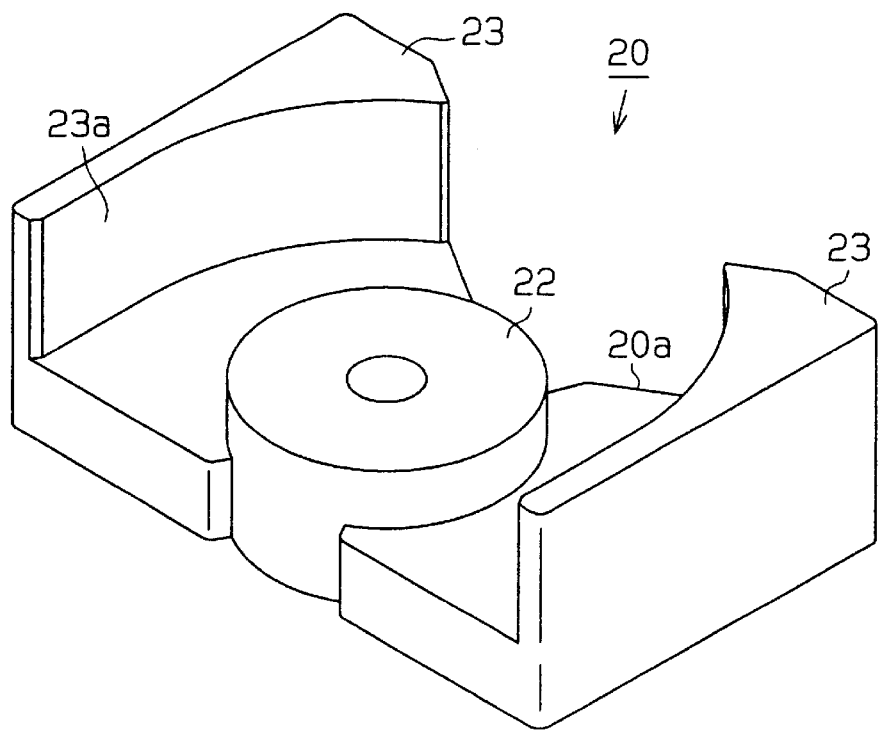
FIG. 5 is a perspective view of a core member constituting one of a core of the power receiver coupler.
Figure 6:
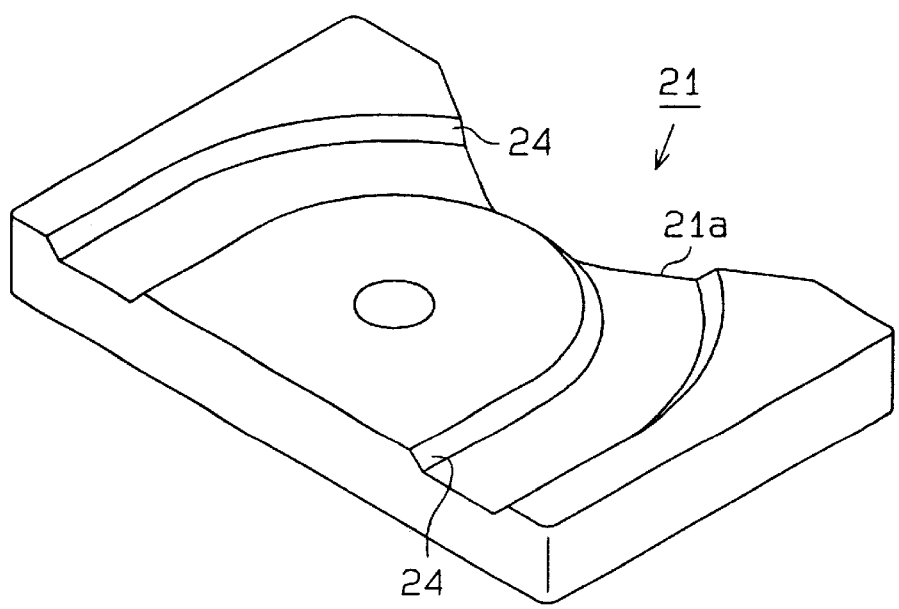
FIG. 6 is a perspective view of another core member of the core of the power receiver coupler.
Figure 8:
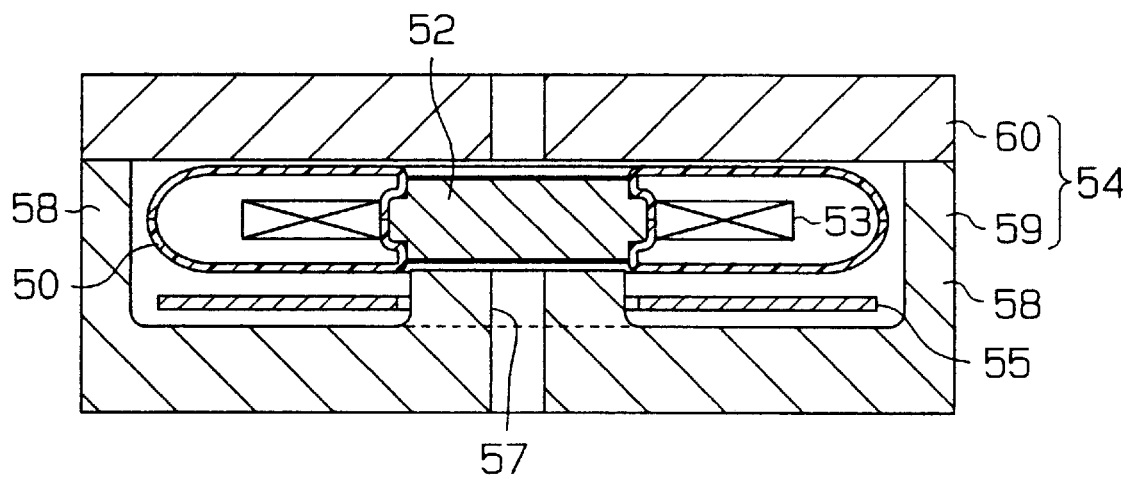
FIG. 8 is a transverse cross sectional view of the electric coupling apparatus taken along line 8—8 of FIG. 7, the casing of the power receiver coupler being omitted for illustrative purposes.

The first core member 20 is shown in detail in FIG. 5. The first core member 20 has a cylindrical magnetic pole 22 and a pair of yokes 23, which are formed at both sides of the magnetic pole 22. More specifically, the yokes 23 have flat portions and upright portions extending from the flat portions, and upright portions are extending parallel to the magnetic pole 22. The upright portions extend further from the flat portions than the magnetic pole 22, as shown in FIG. 5. Each of the yokes 23 has an internal, cylindrical surface 23a having the same center point, and the curved surfaces 23a extend in the same direction as the axis of the magnetic pole 22. The yokes 23 have a V-shape cutout 20a to permit the flow of air, which will be discussed later.

As shown in FIG. 3, the circuit board, on which is formed the secondary coil 19, is formed with a bore, through which the magnetic pole 22 passes. The periphery of the circuit board is supported by the housing 16, which is part of the power receiver coupler 10. The coil 19 is then electrically connected to a power receiving circuit of the power receiver charging device 1.

In FIG. 3, the second core member 21 is attached to the yokes 23 of the first core member 20 to bridge and couple the ends of the yokes 23 for providing a magnetic coupling to the first core member 20. As clearly shown in FIG. 6, the second core member 21 has a generally plate like configuration and a recess 24 formed on a surface facing the first core member 20 to provide a cooling air passage, which will be described below in detail. Part of the recess 24 matches a circle, the center of which is on the axis of the magnetic pole 22 of the first core member 21. As seen in FIG. 3, a space 18a is defined between the first and second core members 20 and 21. The space 18a communicates with a lower end opening 16a of the housing 16 (see FIG. 2) with which the recess 24 also communicates. The second core members 21 also has V-shape cutout 21a to permit the flow of air.

As best seen in FIG. 2, the secondary core 18 is attached to the casing 10a such that the space 18a is aligned with the coupler opening 26. The distance between the end of the magnetic pole 22 of the first core member 20 and the internal surface of the second core member 21 is slightly larger than the thickness of the casing 15 of the power supply coupler 12.

During charging of the battery B (see FIG. 1), the lower, or distal, end of the power supply coupler 12 is inserted through the coupler opening 26 into the casing 10a and into alignment in the space 18a formed between the magnetic pole 22 and the internal surface of the second core member 21. When the lower end of the power supply coupler 12 is inserted into the casing 10a, the primary core 13 of the power supply coupler 12 is placed between the magnetic pole 22 of the power receiver coupler 10 and the second core member 21, which forms a closed magnetic flux path in the core 18. In this condition, the coil 14 is placed at a location close to the recess 24.

Figure 4:
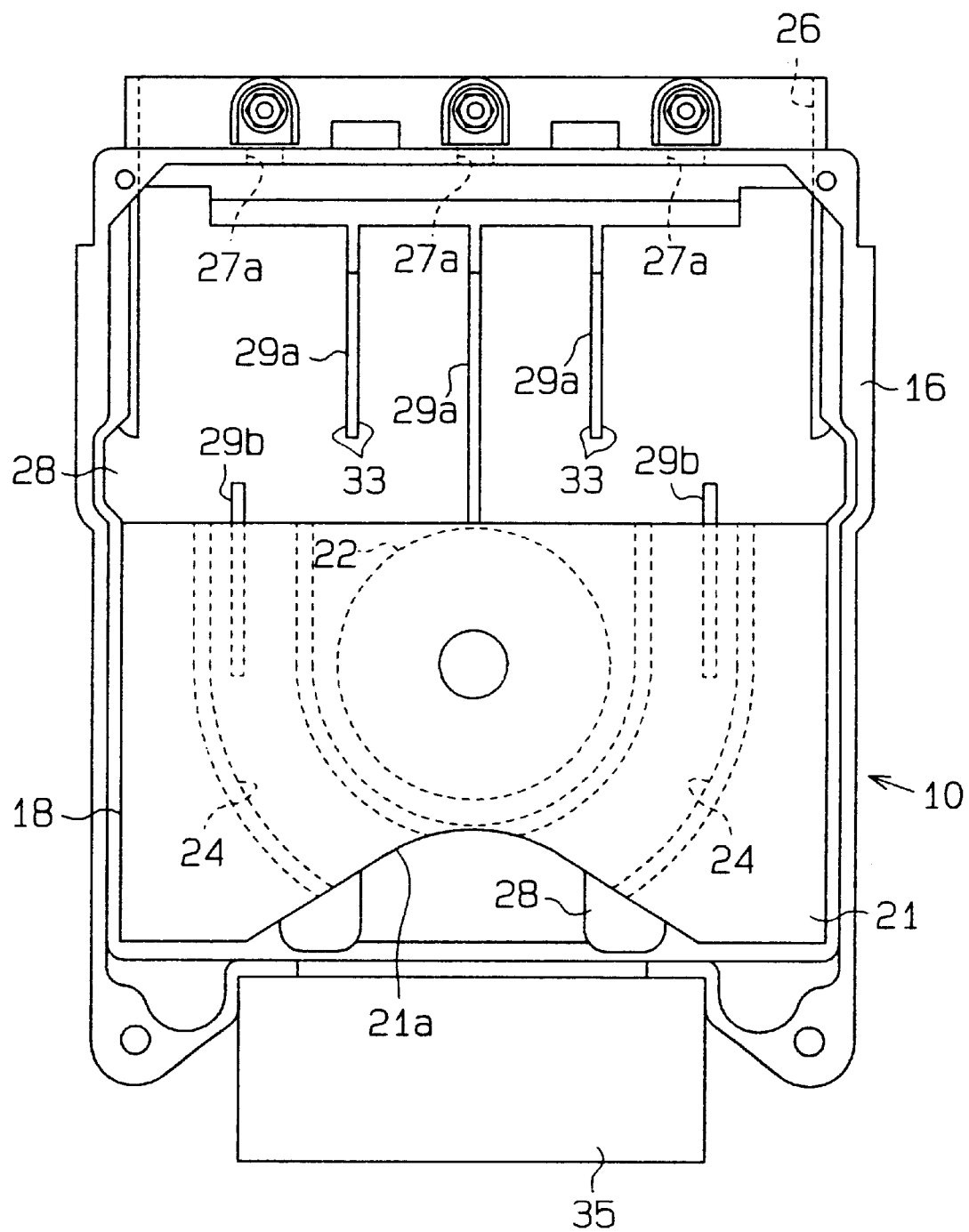
FIG. 4 is a front view of the power receiver coupler with a top cover removed.

As shown in FIG. 2, the housing 16 of the power receiver coupler 10 includes a guide plate 28. The upper end of the guide plate 28 is located near the upper wall 25 of the housing 16 and the lower end of the guide plate 28 located near the lower end opening 16a. Assembling the guide plate 28 is carried out by placing the guide plate 28 over the printed circuit board 19 and fixing the guide plate 28 in the housing 16. The guide plate 28 has an upper portion extending upward from the core 18 and a lower portion located in the space 18a. The guide plate 28 has a bore through which the magnetic pole 22 extends. As best shown in FIG. 4, the upper portion of the guide plate 28 has a plurality of projections 29a, each being semi circular shape or I-shaped in cross section and integrally formed on the surface of the guide plate 28. The projections 29a are formed on the guide plate 28 and extend parallel to each other. As shown in FIG. 2, the front surface of the casing 15 of the power supply coupler 12 contacts the rear ends of the projections 29a, which positions the casing 15. As clearly seen in FIG. 4, the guide plate 28 also has a plurality of projections 29b, which form a plurality of recesses 33 together with the projections 29a. The projections 29balso have a semi circular shape or an I-shape in cross section and are formed integrally with the guide plate 28 such that major portions of the projections 29b extend along the first core member 20.

Under a condition that the power supply coupler 12 shown in FIGS. 2 to 4 is plugged into the power receiver coupler 10, the plural recesses 33 formed in the vicinity of the center of the guide plate 28 are opposed to the front surface of the power supply coupler 12, and the recesses 33 formed in the vicinity of the guide plate 22 are exposed to the space 18adefined between the core members 20 and 21 such that, as best shown in FIG. 3, the recesses 33 communicate with the recess 24 through spaces, forming part of the space 18a, between both the front and rear surfaces of the power supply coupler 12 and inner surfaces of the yokes 23 of the core member 20.

As best seen in FIG. 2, the power receiver coupler 10 has an auxiliary hollow member 31 which is located close to the rear surface of the power supply coupler 12 between the upper wall 25 of the housing 16 and the core 18 of the power receiver coupler 10. The auxiliary hollow member 31 is formed of a material having a channel in cross section. The open end is fixed to the cover 17 by fasteners such as screws. The auxiliary member 31 supports a printed circuit board 30, which is designed to include a communication circuit for communicating battery charging information between the power receiver charging device 1 and the power supply charging device 11 via the power receiver coupler 10 and the power supply coupler 12.

As seen in FIG. 2, the inner surface of the auxiliary member 31 is integrally formed with a plurality of projections 32a and 32b. These projections 32a and 32b are paralleled to the projections 29a, 29b and are parallel to each other. The projections 32a, 32b form a plurality of recesses 34, one of which is shown in FIG. 2. The projections 32a and 32b include short and long projections, which alternate. As seen in FIGS. 2 and 4, for example, the plurality of projections 32a and 32b are formed in the auxiliary member 31 directly to oppose the projections 29b and 29a of the guide plate 28, respectively. Each of the projections 32a and 32b has a semi circular shape or an I-shape in cross section like the projections 29a and 29b. The front of the casing 15 is supported by the projections 29a and 29b and the rear of the casing 15 is supported by the projections 32a and 32b. The casing 15 is guided by the projections 29a, 24a, 32a, 32b during coupling and uncoupling of the power supply coupler 12 to and from the power receiver coupler 10. The recesses 34 communicate with the recesses 24 of the core 18, which communicate further with the space 18a.

In FIG. 2, the upper end portion 25 of the housing 16 is formed with a plurality of apertures 27a, 27b and 27c located around the periphery of the coupler opening 26. The apertures 27a communicate with the recesses 34 via a passage defined between the upper wall 25 of the housing 16 and the auxiliary member 31. The upper wall 25 of the housing 16 includes double walls. The apertures 27b are formed in the upper wall of the double walls, whereas the apertures 27c are formed in a side wall located between the double walls as shown in FIG. 2. The apertures 27b and 27c communicate with the recess 33 through a passage defined between the double walls.

With the structure mentioned above, the power supply coupler 10 is surrounded by the recess 24, the hollow spacing 18a and 21a, and the recesses 33 and 34. More specifically, the recess 24 faces the rear surface of the power supply coupler 10 as shown in FIG. 2. The front surface of the power supply coupler 12 is exposed to the space 18a, as shown in FIG. 3. The upper rear surface of the power supply coupler 12 is positioned outside the core 18 of the power receiver coupler 10 and faces the recess 34. Likewise, the upper front surface of the power supply coupler 12 faces the recess 33 and is exposed through the lower end opening 16a of the casing 10a.

As shown in FIG. 2, a cooling fan 35 is fixed to the bottom of the power receiver coupler 10. The cooling fan 35 includes, for example, an electric motor to drive the fan, and a casing. The cooling fan is located outside the opening 16a of the casing 10a.

When the electric fan 35 is operated, external air is drawn through the apertures 27a. This air flows through the recess 34 to the recess 24, and the air further passes to the lower end of the casing 10a via the opening defined by the cutouts 20a and 21aof the first and second core members 20 and 21, respectively. Thereafter, the air is forced through the lower end opening 16a of the casing 10a to the outside by the electrically driven fan 35. In addition, the external air drawn through the apertures 27a flows through the recess 34 into the space 18a. Thereafter, the air passes through the recess 33 into the opening 16a of the casing 10a and is forced outside by the fan 35. Also, the external air is drawn through the apertures 27b and 27c of the casing 10a and flows through the recess 33. This air flows through the opening defined by the cutouts 20a and 21aof the first and second core members 20 and 21 into the lower end opening 16a of the casing 10a and is exhausted to the outside by the action of the fan 35. Furthermore, the air drawn from the apertures 27b and 27c flows through the recess 33 into the space 18a between the first and second core members 20 and 21 and, thereafter, flows through the recess 24 into the opening 16a, from which the air is exhausted to the outside by the electric fan 35.

More specifically, the air passing through the recesses 33 formed in the vicinity of the center of the guide plate 28 flows into the opening 16a long the front surface of the power supply coupler 12. The air passing through the recesses 33 formed adjacent the sides of the guide plate 28 flows through the spaces between both the side surfaces of the power supply coupler 12 and the inner surfaces of the core member 20 such that a part of the air flows into the opening 16a along the side surface of the power supply coupler 12 while remaining air leaving from the space 18a flows into the opening 16a through the recess 24 opposite to the rear surface of the power supply coupler 12.

At the charging station, the battery charging of the electric vehicle C is carried out by inserting the power supply coupler 12 into the power receiver coupler 10 as shown in FIG. 1. When the power supply coupler 12 is inserted into the power receiver coupler 10 and an alternating current is supplied to the coil 14, an electromagnetic, induction current is generated in the coil 19 of the power receiver coupler 10. This inductive current is delivered to and converted by the charging device 11. A resulting DC current changes the battery B mounted in the vehicle C. After the battery charging is completed, the power supply coupler 12 is pulled out from the power receiver coupler 10. When the power supply coupler 12 is inserted into the power receiver coupler 10, the electric fan 35 of the power receiver coupler 10 also rotates. In this instance, the electric fan 35 is operated during the time that electric power is supplied to the power receiver coupler 10 from the power supply coupler 12.

Due to the action of the electric fan 35, external air is drawn through the apertures 27a, 27b and 27c into the casing 10a and is exhausted from the opening 16a of the lower end of the casing 10a. In this instance, the air drawn through the aperture 27a flows through the recesses 34 and 24 into the lower end opening 16a of the casing 10a. At the same time, the air drawn through the aperture 27a flows through the recess 34 and the space 18a between the first and second core members 20 and 21 into the lower end opening 16a of the casing 10a. The air also flows from the space 18a into the lower end opening 16a via the recess 33. Further, the air drawn through the apertures 27b and 27c flows through the recess 33 into the lower end opening 16a of the casing 10a. At the same time, the air drawn through the apertures 27b and 27c flows through the recess 33 and the space 18a into the lower end opening 16a. Also, cooling air flows through the recess 24 into the lower end opening 16a.

The whole rear surface of the power supply coupler 12 is thus cooled by an air stream flowing through the recess 34 and the recesses 24, and another air stream flowing through recess 33, the hollow spacing 18a and the recesses 34 into the recess 24. The whole front surface of the power supply coupler 12 is cooled by an air stream flowing through the recess 33 and another air stream flowing through the recess 34 and the hollow spacing 18a into the recess 33. In this fashion, the coil 14 is efficiently cooled by the casing 15, which is cooled by air flowing through the recesses 33, 34 and 24.

The primary core 13 of the power supply coupler 12 is directly cooled by air stream passing through the recess 24 and is cooled by heat transfer with the casing 15, which is cooled by the air passing through the recesses 33, 34 and 24.

The secondary core 18 of the power receiver coupler 10 is not only cooled by air passing through the casing 10a but is cooled by the air passing through the recess 24 and the space 18a between the first and second core members 20 and 21. In addition, the secondary coil 19 is not only cooled by outside air via the casing 10a but is also cooled by heat transfer with the guide plate 28, which is cooled by the air stream passing through the recess 33.

The electric coupler for the battery charging device has various advantages which will be described below.

Since the power receiver coupler 10 has a cooling recess 24 in the region surrounding the primary coil 14 of the power supply coupler 12, the coil 14 of the power supply coupler 12 is cooled with high efficiency by heat transfer with the casing 15, which is cooled by air passing through the recess 24. For this reason, even if the gap between the casing 15 and the second core member 21 is thin, efficient cooling of the coil 14 is achieved in a highly reliable manner without loss of high charging rates.

The coolant air recess 24 communicates with a first cooling air passage formed by the aperture 27a and the recess 34, a second cooling air passage formed by the apertures 27b and 27c, the recess 33 and the space 18a between the first and second core members 20 and 21, and a third cooling air passage formed by the cutouts 20a and 21a and the lower end opening 16a, through which the coolant air is exhausted to the outside. For these reasons, the casing 10a of the power supply coupler 12 is efficiently cooled by the air flowing through the coolant air recess 24 and the plural cooling air passages.

The front and rear surfaces of the power supply coupler 12 by the air passing through the recess 33 and the space 18a are the air passing through the recesses 34 and 24. On the other hand, the casing 10a of the power receiver coupler 10 and the auxiliary member 31 are cooled by the air passing through the recess 34. In addition, the core 18 is cooled by the air passing through the recesses 24 and 33 and the space 18a. For the above reasons, most of the component parts of the power supply coupler 12 and the power receiver coupler 10 are reliably cooled.

The electric fan 35 serves to drawn external air into and out of casing of the power receiver coupler 10. Thus, both the power supply coupler 12 and the core 18 of the power receiver coupler 10 are reliably cooled.

Since the recesses 33 and 34 are formed by the projections 29a and 29b, it is easy to arbitrarily modify the distance between the adjacent projections, that is, the width of the recess, in accordance with various circumstances.

It should be apparent to those skilled in the art that the present invention may be embodied in many other specific forms without departing from the spirit or scope of the invention. Particularly, it should be understood that the invention may be embodied in the following forms.

While the secondary core 18 of the power receiver coupler 10 includes the first core member 20, including the magnetic pole and the yokes 23 and the second core member 21, the secondary core may have other configurations. For example, both of the first and second core members may have a magnetic pole and a pair of yokes like the first core member 20, and the secondary core 18 may be assembled in such a manner that the magnetic poles and the yokes face each other to provide a space between the magnetic poles to accommodate the power supply coupler. In this case, the recess 24 may be formed on each surface of the yokes of the first and second core members to face the surfaces of the power supply coupler such that the power supply coupler is efficiently cooled by air stream passing through these recesses.

In the preferred embodiment discussed above, while the electric fan is employed to produce an air stream within the power receiver coupler, the electric fan may be removed depending on the usage circumstances or the usage objectives.

In addition, while there are plural recesses 33 and 34 in the illustrated embodiment, it is possible to modify these recesses into a single recess having an extended width, if required.

Further, while the secondary coil 19 of the power receiver coupler 12 is described as being formed by a printed circuit board, the coil 14 may have the same constitution as that of the secondary coil 19.

Lastly, while the electric coupling apparatus of the present invention has been described as being applied to the electric vehicles, the above apparatus may be incorporated into battery charging devices of other self-propelled apparatus such as self-propelled robots powered by batteries.

What is claimed is:

1. An electrical coupling apparatus for a charging device comprising:
    a power supply coupler including a first coil and a first core around which the first coil is located; and
    a power receiver coupler including a second core, which is formed with a recess in a region adjacent to the first coil to conduct external air to cool the first coil and which forms a magnetic flux path with the first core, and a second coil located around the second core to generate an inductive electromotive force with the magnetic path in response to electric power applied to the first coil.

2. An electric coupling apparatus as claimed in claim 1, wherein the power receiver coupler includes an air passage through which the recess communicates with external air.

3. An electric coupling apparatus for a charging device, comprising:
    a power supply coupler including a hollow casing having a paddle shape, a first core accommodated in the hollow casing, and a first coil located around the first core and in the hollow casing; and
    a power receiver coupler including a second core including a first core member, which has having a magnetic pole, and yokes extending at opposite ends of the magnetic pole, and a second core member for forming a magnetic flux path with the first core member, the power receiver coupler further including a second coil surrounding the magnetic pole to generate an inductive electromotive force in response to electric power applied to the first coil and a casing enclosing the second core and the second coil, the second core having a recess formed in a region facing the first coil to conduct air to cool the first coil, wherein the casing of the power receiver coupler receives the casing of the power supply coupler to couple the power supply coupler with the power receiver coupler, wherein the first coil is adjacent to the recess when the power supply coupler is coupled to the power receiver coupler.

4. An electric coupling apparatus as claimed in claim 3, wherein the casing of the power receiver coupler has an opening to allow the insertion of the casing of the power supply coupler and additional recesses formed between the opening and the second core to permit the recess of the first core to communicate with outside air.

5. An electric coupling apparatus as claimed in claim 4, wherein the power receiver coupler further includes a guide member and an auxiliary member located in the casing of the power receiver coupler in spaced relationship, each member having a plurality of projections protruding inward to form the additional recesses, the plurality of projections serving to position the casing of the power supply coupler in the power receiver coupler.

6. An electric coupling apparatus as claimed in claim 4, wherein the casing of the power receiver coupler has a plurality of apertures to communicate the additional recesses with the outside air.

7. An electric coupling apparatus as claimed in claim 6, wherein the power receiver coupler further includes an electric tan fixed to the casing for generating an air stream through the recesses of the second core, the guide member and the auxiliary member.

8. An electric coupling apparatus as claimed in claim 6, wherein the auxiliary member supports a circuit board.

9. A power receiver coupler for use in an electric coupling apparatus including a power supply coupler, the power supply coupler having a first core and a first coil located around the first core, the coupler comprising:
    a casing having an opening to allow insertion of the power supply coupler;
    a second core located in the casing, the second core including a first part, which has a magnetic pole and yokes, a second part, which is magnetically coupled to the first part, wherein a second coil is wound around the magnetic pole, the second core having a space between the first and second parts to accommodate the power supply coupler to cause the first core to form a closed magnetic flux path with the second core, which produces an inductive electromotive force in the second coil, the second core having a recess that faces the first coil to conduct an air stream to cool the first coil.

* * * * *

UNITED STATES PATENT AND TRADEMARK OFFICE
CERTIFICATE OF CORRECTION

PATENT NO. : 6,320,352 B2
DATED : November 20, 2001
INVENTOR(S) : Masahiko Terazoe It is certified that error appears in the above-identified patent and that said Letters Patent is hereby corrected as shown below:

<u>Title page,</u>
Item [54], the Title, please delete "ELECTRIC COUPLING APPARATUS FOR CHARGING DEVICE" and insert therefor -- ELECTRIC COUPLING APPARATUS HAVING RECESS TO CONDUCT AIR FOR COOLING A CHARGING DEVICE --;

<u>Column 10,</u>
Line 26, please delete "tan" and insert therefor -- fan --

Signed and Sealed this

Twentieth Day of August, 2002

*Attest:*

*Attesting Officer*

JAMES E. ROGAN
*Director of the United States Patent and Trademark Office*